US006447597B1

(12) United States Patent
Repette et al.

(10) Patent No.: US 6,447,597 B1
(45) Date of Patent: Sep. 10, 2002

(54) HYDRATED CALCIUM ALUMINATE BASED EXPANSIVE ADMIXTURE

(75) Inventors: Wellington L. Repette, Ottawa; Noel P. Mailvaganam, Orleans, both of (CA)

(73) Assignee: National Research Council, Ottawa (CA)

( * ) Notice: Subject to any disclaimer, the term of this patent is extended or adjusted under 35 U.S.C. 154(b) by 0 days.

(21) Appl. No.: 09/497,528

(22) Filed: Feb. 4, 2000

(51) Int. Cl.$^7$ ................................................ C04B 7/32
(52) U.S. Cl. ........................ 106/692; 106/693; 106/695; 106/696; 106/732; 106/735; 106/783
(58) Field of Search ................................ 106/692, 693, 106/695, 696, 732, 735, 783; 428/404

(56) References Cited

U.S. PATENT DOCUMENTS

| | | | |
|---|---|---|---|
| 5,741,357 A | 4/1998 | Sheikh | 106/692 |
| 5,846,316 A | 12/1998 | Rice | 106/735 |

OTHER PUBLICATIONS

ACI Materials Journal—"Expansive Cement Concrete for Drilled Shafts"—S.A. Sheikh, et al. (May–Jun. 1994)—pp. 237–245.

Publication entitled—"Prehydrated High–Alumina Cement– Based Admixture for Compensating Autogenous Shrinkage in High–Performance Concrete"—W.L. Repette, et al. (Jun. 1, 1999)—pp. 39–58.

Cement & Concrete Research publication, vol. 26, No. 3—"Effect of Different Calcium Aluminate Hydrates on Ettringite Formation and Expansion of High Alumina Cement–Based Expansive Cement Pastes"—Y. Fu, et al. (Mar. 1996)—pp. 417–426.

Cement & Concrete Research publication, vol. 24, No. 2—"Characteristics of Shrinkage Compensating Expansive Cement Containing a Pre–Hydrated High Alumina Cement– Based Expansive Additive"—Y. Fu, et al. (1994)—pp. 267–276.

Noyes Publication—Concerete Admixtures Handbook, Properties, Science and Technology—"Miscellaneous Admixtures"—N.P. Mailvaganam (1984)—pp. 480–507.

Publication entitled—Calcium Sulfoaluminate Based Expansion Producing Admixtures—Wellington L. Repette, et al.—Two–Day CANMET/ACI International Workshop on supplementary Cementing Materials, Superplasticizers and Other chemical Admixtures in Concrete—(Apr. 6–7, 1998), Toronto, Canada.

Cement & Concrete Research publication, vol. 25, No. 6—"Expansion Characteristics of a Compounded–Expansive Additive and Pre–Hydrated High Alumina Cement Based Expansive Additive"—Y. Fu, et al. (1995)—pp. 1295–1304.

*Primary Examiner*—Paul Marcantoni
(74) *Attorney, Agent, or Firm*—Paul S. Sharpe; Marks & Clerk

(57) ABSTRACT

An additive, a mixture incorporating the additive and a method of formulating a mortar incorporating the additive. The additive is based on calcium sulfoaluminate composed of $C_3AH_6$ and $CAH_{10}$ where C=calcium oxide, A=aluminum oxide and H=water. The admixture includes gypsum and calcium hydroxide. The calcium aluminum hydrates are obtained by hydration of high alumina cement particles to eliminate any lack of hydration in the core of the particle. The method involves the preparation of such particles and the mix incorporates the particles to produce a homogeneously hydrated cement additive.

40 Claims, 5 Drawing Sheets

(A)          (B)

HYDRATED CALCIUM ALUMINATE BASED EXPANSIVE ADMIXTURE

FIELD OF THE INVENTION

The present invention relates to hydrated calcium aluminate expansive materials and more particularly, the present invention relates to shrinkage compensating admixtures for mortar, concrete and cementitious construction products.

BACKGROUND OF THE INVENTION

Contraction or shrinkage is an inherent characteristic of cementitious materials with concomitant cracking and other related structural failures. Three broad categories characterize shrinkage, namely: plastic, autogenous and drying. In order to minimize shrinkage strains, shrinkage reducing admixtures (SRA) and shrinkage compensating admixtures (SCA) are incorporated in the cementitious materials. Although SRA reduces shrinkage strains, its effectiveness is compromised in freezing and thawing conditions and its use is limited because it is a liquid component. Calcium sulfoaluminate based admixtures are the most effective SCA. These additives promote expansion in the mix that counteracts shrinkage deformations. They are largely used in cementitious mixes, allowing for good flexibility in the formulation of cementitious materials, at a lower cost, and can be dry blended with cement. These materials have utility in certain circumstances, but are limited in freezing and thawing conditions. One of the more commonly used SRA compositions is calcium sulfoaluminate admixture (CSA). This additive is useful for enhancing flexibility in the formulation of cementitious materials at a lower cost and also facilitating the possibility of dry blending the mixture with cement.

In the prior art, Sheikh, U.S. Pat. No. 5,741,357, issued Apr. 21, 1998, provides a hydrated high alumina cement. This reference teaches that the inner core of the particles is the anhydrous alumina bearing material and is accordingly a source of aluminates necessary the formation of ettringite and subsequent expansion. The outer coat of hydrated products prevents the rapid dissolution of the inner core material to control the formation of ettringite and the timing of expansion. Although this technology is quite meritorious, it was somewhat limited in effectiveness of the prehydration process in preventing the accelerated reaction of the high aluminous cement and the inconsistency produced in relation to the degree and timing of expansion.

One of the primary limitations of the technology in U.S. '357 relates to the fact that the particles are ground for the production of the admixture. As will be appreciated, due to the grinding, a mixture of particles having differing amounts of unhydrated product unprotected by the hydrated crust naturally result (FIG. 1). This subsequently translates into potential inconsistency in the rate and amount of expansion obtained by the admixture. Such a limitation can compromise the performance of the admixture as an effective shrinkage compensating agent.

Having regard to the progress made in this field as outlined in the Sheikh patent, the present application overcomes the admixture homogeneity problem and teaches an admixture that can be dry blended with cementitious material to provide a homogenous final product.

SUMMARY OF THE INVENTION

An objective of all embodiments of the present invention is to provide an improved cementitious additive and mixture incorporating the additive for use in cementitious compounds to alleviate the complications and limitations in the compositions of the known art.

It is an object of one embodiment of the present invention to provide an expansive additive for controlling shrinkage in a cementitious mixture, comprising:
  calcium aluminate particles where at least 75% by mass of the particles are hydrates of $C_3AH_6$ $CAH_{10}$ or a mixture thereof, where C represents CaO, A represents $Al_2O_3$, and H represents $H_2O$;
  an expansion effecting sulfate-based compound for effecting expansion in the mixture; and
  calcium hydroxide.

A further object of one embodiment of the present invention is to provide a cementitious mixture having reduced shrinkage upon curing, comprising:
  cementitious material;
  calcium aluminate particles where at least 75% by mass of the particles are hydrates of $C_3AH_6$, $CAH_{10}$ or a mixture thereof, where C represents CaO, A represents $Al_2O_3$, and H represents $H_2O$;
  an expansion effecting sulfate-based compound for effecting expansion in the mixture; and
  calcium hydroxide.

In the prior art, there is no teaching with respect to the use of a high by mass concentration of $C_3AH_6$ hydrates, $CAH_{10}$ hydrates or a mixture of these as an addition for a cementitious mixture. In fact, the prior art methods and compounds are focused upon anhydrous particles. Fu, et al., in "Characteristics of Shrinkage Compensating Expansive Cement Containing a Pre-Hydrated High Alumina Cement-Based Expansive Additive", *Cement and Concrete Research*, Vol. 24, No. 2, pp 267–276, 1994, are concerned with the use of the anhydrous material to effect desirable results.

In the present invention, it has been found that the additive can effectively be customized for specific uses/environments of use and, therefore, is not limited to a specific field of utility, but rather is useful in a host of cementitious mixtures.

A still further object of one embodiment of the present invention is to provide a method for synthesizing hexagonal phase calcium aluminate hydrate particles, comprising the steps of:
  i) providing a source of calcium aluminate particles;
  ii) hydrating the calcium aluminate sufficiently to form a slurry;
  iii) agitating the slurry sufficiently for hydration to occur and form hexagonal phase calcium aluminate hydrate particles;
  iv) maintaining the temperature of the slurry to prevent thermal conversion of the hexagonal phase calcium aluminate hydrate particles to cubic phase calcium aluminate particles; and
  v) drying the slurry at a temperature suited to prevent thermal conversion of the hexagonal phase calcium aluminate hydrate particles to cubic phase calcium aluminate particles.

Another object of one embodiment of the present invention is to provide a method for synthesizing cubic phase calcium aluminate hydrate particles, comprising the steps of:
  i) providing a source of calcium aluminate particles;
  ii) hydrating the calcium aluminate sufficiently to effect hydration of at least 75% by mass of the particles in a slurry;

iii) agitating the slurry sufficiently for hydration to occur;

iv) maintaining the temperature of the slurry in a range sufficient to convert any hexagonal phase calcium aluminate particles formed to cubic phase calcium aluminate hydrate particles; and v) drying the slurry.

By controlling the amount of unhydrated (anhydrous) material present, the inherent variability of the prior art mixtures is avoided. The complete hydration of 75% of the mass to form $C_3AH_6$ and $CAH_{10}$ allows for full predictability in the final product.

A further object of one embodiment of the present invention is to provide a method for synthesizing cubic phase calcium aluminate hydrate particles, comprising the steps of:

i) providing a source of calcium aluminate particles;

ii) hydrating the calcium aluminate particles;

iii) curing the mixture in a humid atmosphere for a period sufficient to prevent self desiccation at a temperature sufficient to effect conversion of hexagonal phase particles to the cubic phase calcium aluminate hydrate particles; and iv) drying the mixture.

A still further object of one embodiment of the present invention is to provide a method of forming a cementitious mixture having reduced shrinkage in use, comprising mixing the compounds:

i) cementitious material;

ii) an expansion effecting sulfate compound for effecting expansion in the mixture;

iii) calcium hydroxide; and iv) presynthesized calcium aluminate hydrate particles formed by the method of claim 14.

An even further object of one embodiment of the present invention is to provide a method of forming a cementitious mixture having reduced shrinkage in use, comprising mixing the compounds:

i) cementitious material;

ii) an expansion effecting sulfate compound for effecting expansion in the mixture;

iii) calcium hydroxide; and iv) presynthesized calcium aluminate hydrate particles formed by the method of claim 19.

As very briefly touched on earlier, plastic shrinkage occurs in the fresh (plastic) state while the concrete is setting and hydrating after its placement. It is aggravated by the incorporation of flyash and retarding admixtures. Both of these materials (flyash and retarders) are vital to offset deleterious cracking under hot weather conditions. One of the chief methods of overcoming this limitation is early and prolonged (three days) water curing—rather cumbersome in the field and, therefore, often avoided. In cementitious mortar, grouts and patching materials, aluminum flakes or fine particles of coke are used. These materials produce gas ($H_2$ and air) in the fresh state which renders a buoyancy to the mix, thus reducing the settlement of the heavier stone in the mix, reducing plastic shrinkage.

These materials, however, are affected by the variations in field practice (water content of mix and varying ambient conditions). As a feature of one embodiment of the present invention, $CAH_{10}$, when added to the concrete on mortar, will perform to minimize plastic shrinkage but without the limitations of:

potential hydrogen embrittlement (for aluminum powder); and drastic reduction in expansion at lower temperatures (for coke).

Another object of one embodiment of the present invention is to provide a method of forming a cementitious mixture having reduced shrinkage in use, comprising mixing the compounds:

i) cementitious material;

ii) an expansion effecting sulfate compound for effecting expansion in the mixture;

iii) calcium hydroxide; and iv) presynthesized calcium aluminate hydrate particles formed by the method of claim 27.

A further object of one embodiment of the present invention is to provide a method of forming a cementitious mixture having reduced shrinkage in use, comprising mixing the compounds:

i) cementitious material;

ii) an expansion effecting sulfate compound for effecting expansion in the mixture;

iii) calcium hydroxide; and iv) presynthesized calcium aluminate hydrate particles formed by the method of claim 23.

Applicability of the technology set forth herein is widespread. As an example, cementitious mixtures where utility is clear include Portland cement, flyash, blast furnace slag, rice husk ash, type K, S and M cement, grout, stucco, shotcrete, patching and concrete among a host of others.

Having regard to the fact that distinct particles can be prepared (hexagonal, cubic or mixtures thereof), it is evident that full control of expansion is possible. Clearly this affords the user with the ability to change a specific mixture depending on specific requirements, environmental conditions etc., all of which were not previously available in the prior art methods and materials.

It is envisioned that the admixtures disclosed herein will have utility in borehole plugging, soil stabilization, mining, oil well cementing, flooring products, injection grouting, overlays, grouts, etc.

Having thus described the invention, reference will now be made to the accompanying drawings illustrating preferred embodiments.

DETAILED DESCRIPTION OF THE PREFERRED EMBODIMENTS

Figure 1:
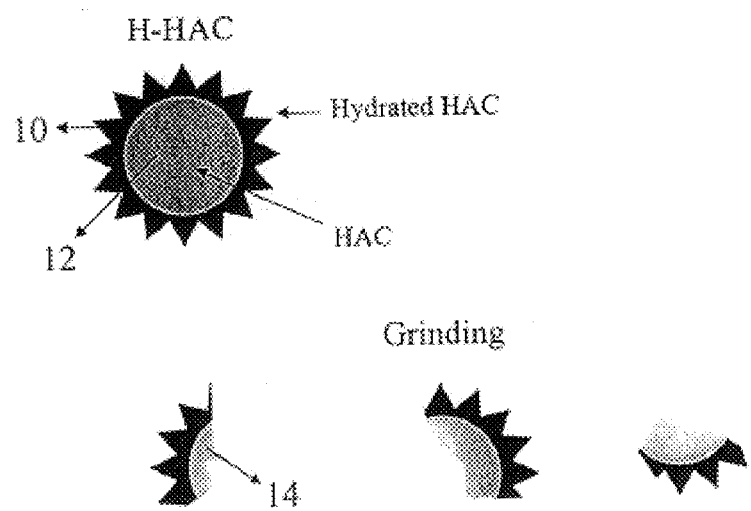
FIG. 1 is a schematic illustration of the particles as formed in the prior art.

Initially, the effectiveness of the additives in accordance with the present invention were tested in mortars and pastes prepared with Type 10 cement (normal Portland cement) and various types and amounts of the expansive mixtures. The calcium aluminate hydrate, hereinafter referred to as CAH, expansive admixtures were prepared with defined amounts of cubic calcium aluminate hydrate ($C_3AH_6$) or hexagonal particles ($CAH_{10}$), gypsum and lime. The effectiveness of the CAH admixture was compared with that of the admixture prepared with anhydrous high alumina cement. Pastes of Type K expansive cement were also prepared.

With respect to the preparation of the $CAH_{10}$ this was conducted through the hydration of high alumina cement, hereinafter referred to as HAC, at temperatures of between 5° C. and 6° C. and not exceeding 7° C. for at least 24 hours. This is referred to as the cold slurry process. It is preferred that the hydration occurs in a slurry containing HAC and water in a proportion of 1:10 by mass and the mixture kept at a temperature of 5° C. and under continuous stirring or agitation for 24 hours.

Subsequent to hydration, the slurry may be filtered and rinsed with acetone at 5° C. This product is then dried most desirably under vacuum conditions and at a temperature not greater than 25° C. The drying should continue until the change in mass is less than $1.0 \times 10^{-2}$ gkg$^{-1}$ of the mass at 24 hours. It has been found that grinding of the solid particles is generally not necessary since the hydration process produces particle sizes which are suitable for use in the CAH admixture. Accordingly, grinding is an option.

Turning to the method of preparation of the cubic particles, this is conducted under hydration of HAC at temperatures greater than 70° C. Hereinafter, this process will be referred to as the hot slurry process. The process includes a slurry containing HAC and water in a proportion of 1:10 by mass and kept at a temperature sufficient to effect thermal conversation of hexagonal particles present to cubic particles. A typical range is between 60° C. and 80° C. The mixture is stirred continuously to ensure hydration, typically for between ten minutes and 40 minutes. Subsequent to hydration, the slurry is filtered and dried in an atmosphere suitable for preventing carbonation at a temperature of between 25° C. and 26° C. Similar to the cold slurry process set forth above, the drying most desirably proceeds until such time as the change in mass is $1.0 \times 10^{-2}$ gkg$^{-1}$ of the mass at 24 hours. Similar to the above, grinding is not required but optional.

As an alternative, the cubic particles may be synthesized by a controlled hydration of the $CAH_{10}$ at temperatures in excess of 70° C. Generally, a slurry containing the $CAH_{10}$ and water in a proportion of 1:10 by mass is kept at a temperature between 60° C. and 80° C. and is stirred continuously similar to that as set forth with respect to the hot slurry. Subsequent to hydration, the temperature range noted with respect to the hot slurry and the carbon dioxide atmosphere are observed. Drying is deemed complete once there is the change of mass noted with respect to the hot slurry.

In both embodiments, the product has fully hydrated particles which is diametrically opposed to the prior art. The calcium aluminate hydrate particles are employed in the additives when at least 75% by mass of the particles are hydrates of $C_3AH_6$, $CAH_{10}$ or a discreet mixture of the particles. The remaining 25% by mass or less are anhydrous or hydrates other than hydrated $CAH_{10}$ or $C_3AH_6$.

In a further process variation, the cubic particles may be prepared by a cake process. In this protocol, a paste of high aluminous cement and water is prepared in the proportion of 1:0.5 by mass and cast into molds of 35×40×4 cm and kept to cure in a 100% relative atmosphere at a temperature of 21° C. for 24 hours. This step prevents self dessication. Having regard to the hydration reactions, the temperature in the "cake" is permitted to rise to at least 60° C. for thermal conversion of hexagonal particles to cubic particles after a period of approximately six hours from the time of casting and remains above this value for at least an additional six hours. Subsequent to this hydration, the so-formed cake is ground into particles that are dry and a temperature of between approximately 25° C. and 27° C. in an atmosphere for preventing carbonation, ideally devoid of carbon dioxide. Drying is complete at the point where the change in mass is less than $1.0 \times 10^{-2}$ gkg$^{-1}$ (approximately 3% of the particles mass) of the mass at 24 hours.

Consistent with the same general methodology for the cubic phase particles discussed above, hexagonal particles may be prepared. Particle formation of the hexagonal type can be prepared by identical steps with the exception that the temperature be maintained at 7° C. or less as opposed to 60° C. This provision ensures that thermal conversion is not an issue and will successfully result in the formation of the hexagonal particles.

Turning to the sulfate bearing material for the preparation of CAH, useful compounds include calcium sulfate dihydrate gypsum ($CaSO_4.2H_2O$) with a purity level greater than 90% by mass. Other suitable compounds include hemihydrate ($CaSO_4.1/2H_2O$) and anhydrite ($CaSO_4$), aluminum sulfate, sodium sulfate, inter alia. In the present technology, it is preferred that the calcium compound comprise calcium hydroxide ($Ca(OH)_2$). The level of calcium material incorporated into the CAH admixture achieves two objectives, namely:

a. minimization of the susceptibility of the CAH admixture to $Ca(OH)_2$ starvation due to competition from other concrete ingredients such as silica fume, mineral and superplasticizing admixtures and hence reduced expansion;

b. to reduce the variability in performance of the cementitious material caused by the different consistencies and mixtures of proportions used in construction.

In the instant invention, the most desirable CAH admixture includes the following components: calcium aluminate hydrate particles (either cubic phase or hexagonal phase) to gypsum ranges from between 1:0.35 and 1:0.55; ratio of calcium aluminate hydrate particles (either cubic phase or hexagonal phase) to lime ranges from between 1:0.07 and 1:0.15; the ratio of cubic particles to hexagonal particles of between 1:0.0 and 1:0.15.

It will be appreciated that these proportions can be significantly varied depending upon the conditions of temperature and desired end use of the product.

The effectiveness of the shrinkage compensating admixtures (the CAH admixture) in mortar and concrete was evaluated according to the following criteria:

the admixture cannot cause flashsetting or drastically reduce the workability of the mix;

the majority of the promoted expansion should occur after the final setting and most desirably following 24 hours after the mix; and there should be no decrease in mechanical strength or other adverse effects on the durability from the use of the expansive admixture.

The cement used in the process was high alumina cement having the following oxide composition (% by mass):

$SiO_2$=19.8; CaO=39.8; $Al_2O_3$=41.2; $Fe_2O_3$=11.3;
MgO=0.6; $Na_2O+K_2O$=0.1.

Prior to discussing the details of the results from the instant application, FIG. 1 requires discussion. In this figure, a schematic illustration of the particles is synthesized by the prior art technique. As illustrated, the particle is effectively partially prehydrated in which a coat of hydrated products 10 encompass an inner core 12 of unhydrated high alumina cement. It was believed that the exterior coat 10 delayed the formation of the expansive products by the admixture. Although the objective of the prehydration is to prevent rapid reaction of the high alumina cement and also delay the formation of the expansive product, this is unfortunately not realized in practice. Part of the complication arises when the particles shown in FIG. 1 are ground into smaller particles 14. Once ground, the result is a mixture of particles having differing amounts of unhydrated product unprotected by the hydrated crust. This variability is the primary cause for inconsistency of rate and degree of expansion obtained by the admixture. The concomitant limitations in performance as an effective shrinkage compensating or expansion promoting admixture are realized particularly in relation to field applications.

For purposes of discussion of the Figures, the cubic phase particles were produced by the cake methodology discussed herein previously and the hexagonal cake particles were prepared by the cold slurry process. The cement employed was high alumina cement, the type of which has been indicated in the previous page.

Figure 2:
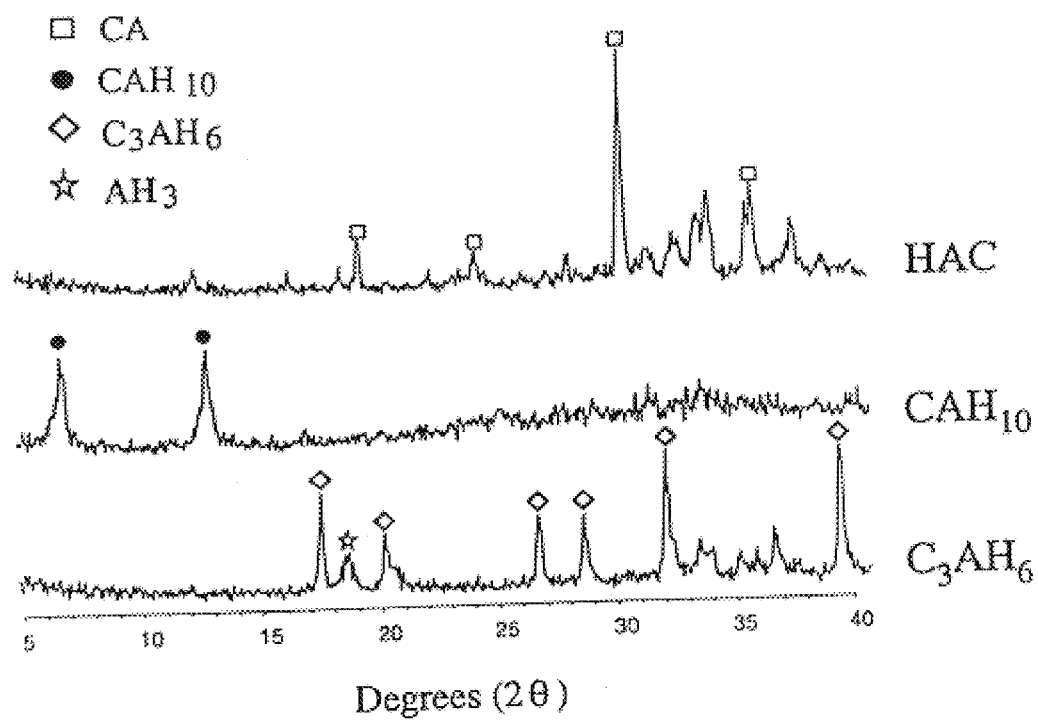
FIG. 2 is a series of X-ray diffraction spectroscopic traces for unhydrated high alumina cement particles and for the hexagonal and cubic phase particles.

The analyses of the calcium aluminate hydrate were determined by X-Ray diffraction spectra using a Rigarku X-ray Diffractometer System Gigerflex D/Max-B. The X-Ray diffraction spectroscopic traces for the hexagonal phase, cubic phase and unhydrated particles are shown in FIG. 2. The spectroscopic data illustrates that the particles of the hexagonal phase do not present traces of cubic phase particles or any other hydrated product and finally, the particles of the cubic phase do not present spectroscopic traces of the hexagonal phase or other calcium aluminate hydrates.

Figure 3:
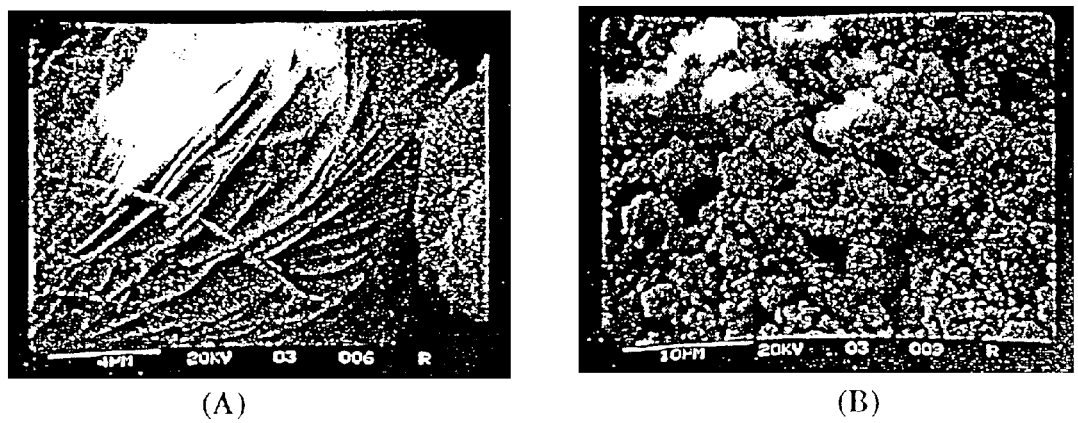
FIG. 3a is a photomicrograph of the calcium aluminum hydride particles in the hexagonal phase.
FIG. 3b is a photomicrograph of the calcium aluminum hydride particles in the cubic phase.

FIG. 3 illustrates photomicrographs obtained by a scanning electromicroscope, illustrating the morphological characteristics of the cubic phase and hexagonal phase particles. From an examination of the photomicrographs, the cubic phase morphology is much more dense relative to the morphology of the hexagonal phase particles.

Figure 4:
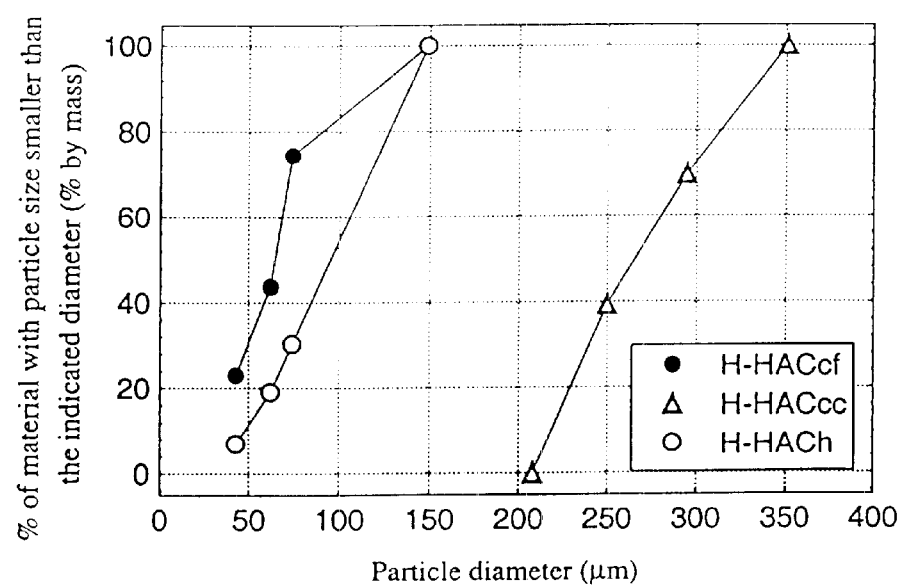
FIG. 4 is a graphical representation of particle size distribution of the hexagonal particles and cubic particles used in the preparation of the additive.

The cubic phase particles obtained through the cake process were ground and sieved into two different particle size distributions. The coarser material is referred to as $C_3AH_6$—C and the finer $C_3AH_6$—F. The distributions of the calcium aluminate hydrates used for the preparation of the calcium alumina hydrate admixture are illustrated in FIG. 4.

Paste mixtures were prepared for the determination of heat evolution by the conduction calorimetry technique. Paste mixture proportions are indicated in Table 1. Mortar mixtures containing normal Portland cement (Type 10), sand and the CAH admixture were prepared with mixture proportions reported in Table 2.

TABLE 1

Paste mixture proportions

| | | | | Components (g) | | | | | |
|---|---|---|---|---|---|---|---|---|---|
| | Cement | | Type K | | H-HAC admixture | | | | |
| Mix | (Type 10) | HAC | Cement | $CAH_{10}$ | $C_3AH_6$—F | $C_3AH_6$—C | Gypsum | $Ca(OH)_2$ | Water |
| P-NPC | 100 | — | — | — | — | — | — | — | 50 |
| P-H | 80 | — | — | 12.5 | — | — | 6 | 1.5 | 50 |
| P-CF | 80 | — | — | — | 12.5 | — | 6 | 1.5 | 50 |
| P-HAC | 80 | 12.5 | — | — | — | — | 6 | 1.5 | 50 |
| P-K | — | — | 100 | — | — | — | — | — | 50 |

TABLE 2

Mortar mixture proportions

| | | | Components (g) | | | | | | |
|---|---|---|---|---|---|---|---|---|---|
| | | | | H-HAC admixture | | | | | |
| Mix | Cement | HAC | $CAH_{10}$ | $C_3AH_6$—F | $C_3AH_6$—C | Gypsum | $Ca(OH)_2$ | Sand | Water |
| NPC | 1500 | — | — | — | — | — | — | 3000 | 675 |
| H 10 | 1350 | — | 93.75 | — | — | 45 | 11.25 | 3000 | 675 |
| H 15 | 1275 | — | 140.6 | — | — | 67.5 | 16.9 | 3000 | 675 |
| H 20 | 1200 | — | 187.5 | — | — | 90 | 22.5 | 3000 | 675 |
| CF 10 | 1350 | — | — | 93.75 | — | 45 | 11.25 | 3000 | 675 |

TABLE 2-continued

Mortar mixture proportions

Components (g)

| Mix | Cement | HAC | CAH$_{10}$ | C$_3$AH$_6$—F | C$_3$AH$_6$—C | Gypsum | Ca(OH)$_2$ | Sand | Water |
|---|---|---|---|---|---|---|---|---|---|
| | | | | H-HAC admixture | | | | | |
| CF 15 | 1275 | — | | 140.6 | | 67.5 | 16.9 | 3000 | 675 |
| CF 20 | 1200 | — | — | 187.5 | — | 90 | 22.5 | 3000 | 675 |
| CC 10 | 1350 | — | — | — | 93.75 | 45 | 11.25 | 3000 | 675 |
| CC 15 | 1275 | — | | | 140.6 | 67.5 | 16.9 | 3000 | 675 |
| CC 20 | 1200 | — | — | — | 187.5 | 90 | 22.5 | 3000 | 675 |
| HAC 20 | 1200 | 187.5 | — | — | — | 90 | 22.5 | 3000 | 675 |

CAH admixtures were obtained by combining 62.5% if calcium aluminate hydrates (C$_3$AH$_6$—F, C$_3$AH$_6$—C or CAH$_{10}$) with 30% of gypsum and 7.5% of calcium hydroxide with proportions given in % by total mass.

The chemical composition of the materials employed in the mixtures were as follows: normal Portland cement (Type 10) (ASTM) with the following oxide contents expressed in % by total mass: SiO$_2$=19.8; CaO=61.2; Al$_2$O$_3$=4,2; Fe$_2$O$_3$=3.2; MgO=41; SO$_3$=39; Na$_2$O=0.45; and, K$_2$O=0.82. The gypsum employed had a purity of at least 90% by mass; hydrated lime had a purity of 95% by mass. Standard sand was also used, which sand falls into compliance with ASTM C 778.

CAH admixtures were obtained by combining 62.5% if calcium aluminate hydrates (C$_3$AH$_6$—F, C$_3$AH$_6$—C or CAH$_{10}$) with 30% of gypsum and 7.5% of calcium hydroxide with proportions given in % by total mass. The gypsum employed had a purity of at least 90% by mass; hydrated lime had a purity of 95% by mass. Standard sand was also used, which sand falls into compliance with ASTM K 778.

Having thus described the chemical compositions and protocol for the instant invention, reference will now be made to the tests that were conducted for the mixtures.

Mortar—Flowability Tests

The effect of the CAH admixtures on the workability of the mortar was determined by flow loss with time according to ASTM C 185. The last flow measurement was taken at the time of the initial setting of the mortar.

Figure 5:
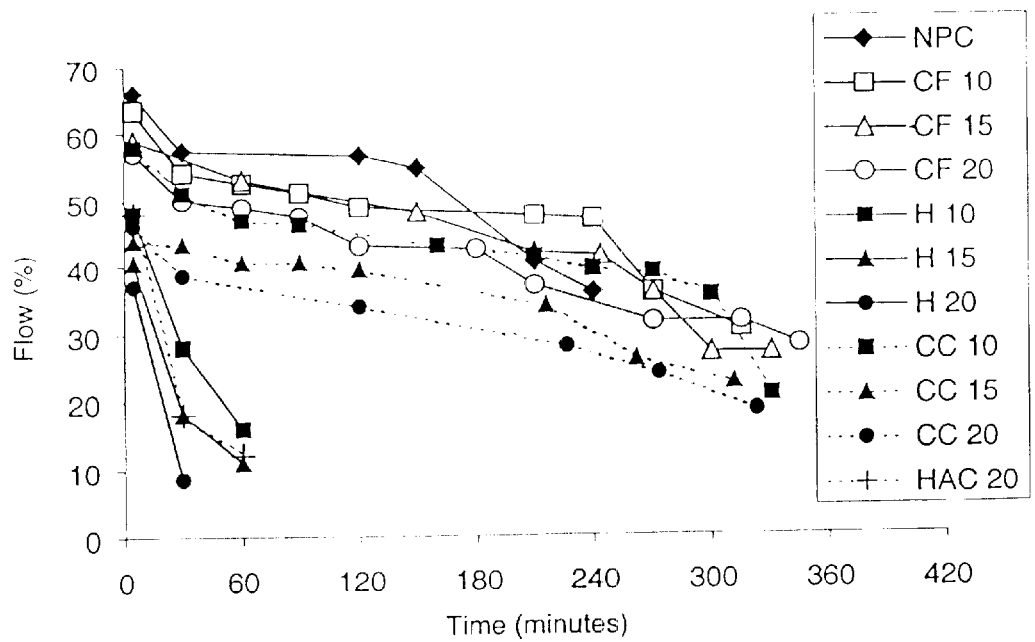
FIG. 5 is a graphical representation illustrating the loss of flow of mortars containing different amounts and compositions of expansive admixtures with time.

FIG. 5 illustrates the decay of flow as a function of the dosage and type of expansive admixture. It is evident from FIG. 5 that no significant decay of flow was realized when the mortars were prepared with C$_3$AH$_6$—F or C$_3$AH$_6$—C particles. By using higher amounts of the admixture prepared with coarser particle size produced a slight reduction in the workability of the mortar (mixtures CC15 and CC20). As contrasting results, the use of CAH$_{10}$ (mixtures of H10, H15 and H20) caused intense reduction in flow. These results were similar to that of the mortar containing HAC based admixture (HAC20).

Mortar—Initial and Final Set Times

Figure 6:
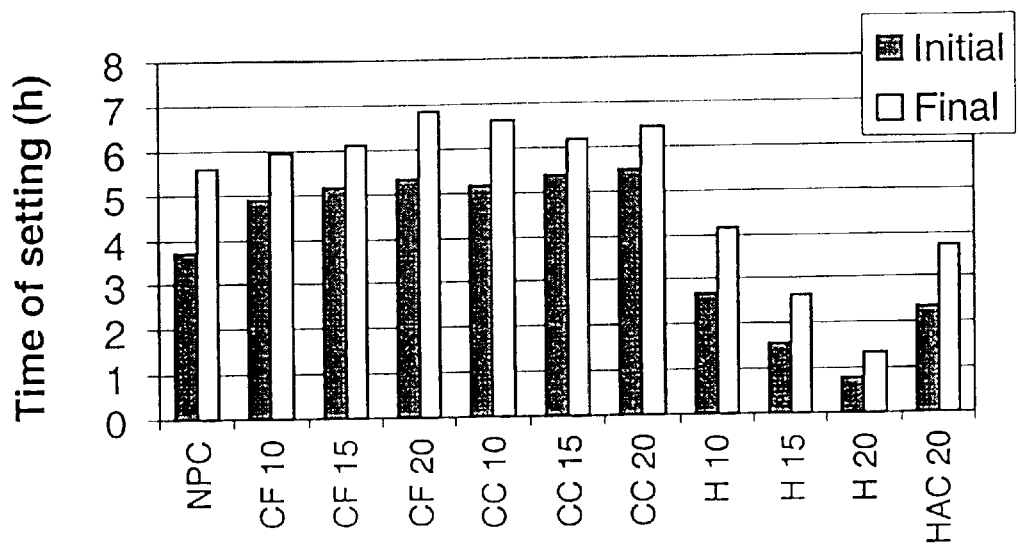
FIG. 6 is a graphical representation illustrating the time of setting of the mortars prepared with different amounts and compositions of the expansive admixtures.

Initial and final set times were determined according to ASTM C 191. The results are tabulated in FIG. 6. It was observed that there are no differences for initial and final set times when using CAH admixture prepared with C$_3$AH$_6$—F or C$_3$AH$_6$—C particles and it was further noted that there is no influence of particle size of these calcium aluminate hydrates. As a contrast, the use of the CAH admixture prepared with CAH$_{10}$ particles (mixtures H10, H15 and H20) caused a significant reduction in the initial and final set times with the results similar to those of the mortar containing the HAC based admixture (HAC20).

Mortar—Free Expansion Tests

Figure 7:
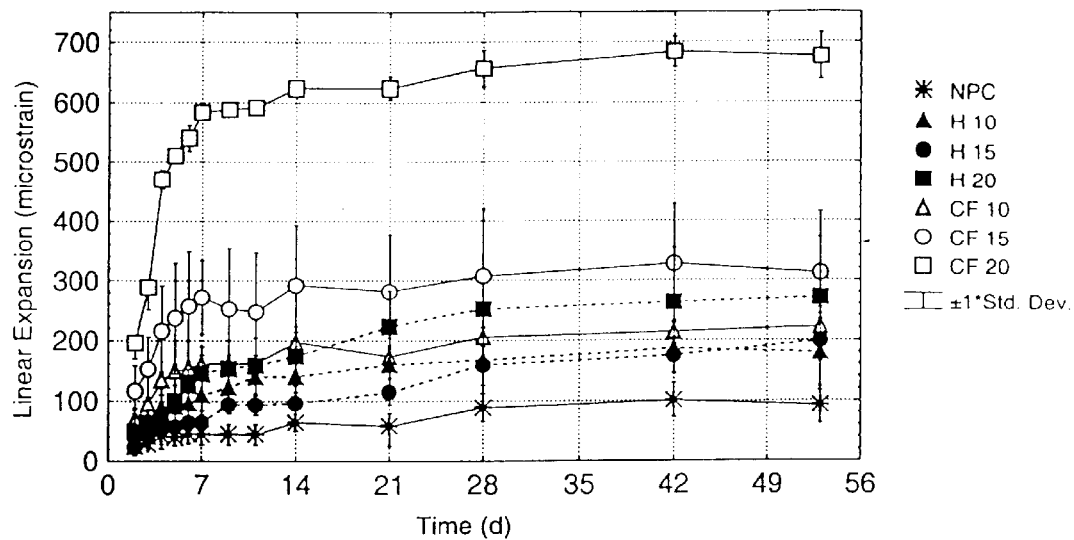
FIG. 7 is a graphical representation illustrating the linear free expansion promoted by the additive in mortars prepared accordingly with the mixtures of Table 2.

For the mortar mixture presented in Table 2, several prisms (25.4×25.4×160 mm) were prepared and tested for linear free expansion consistent with ASTM C 1038. The samples were exposed to an environment at 100% relative humidity and at a temperature of between 19° C. to 23° C. and most desirably 21° C. for 53 days. The linear dimensional changes were measured at intervals of 24 hours. The initial length was obtained 24 hours after the casting, with the results of the free expansion test being graphically illustrated in FIGS. 7 and 8. With respect to FIG. 7, presented are the effects of the type of calcium aluminate hydrate particles used in the CAH admixture and dosage of CAH admixture on the expansion produced. The results demonstrate that at the same dosages, the admixture prepared with C$_3$AH$_6$—F particles produced a greater degree of expansion than the admixture prepared with CAH$_{10}$ particles.

Figure 8:
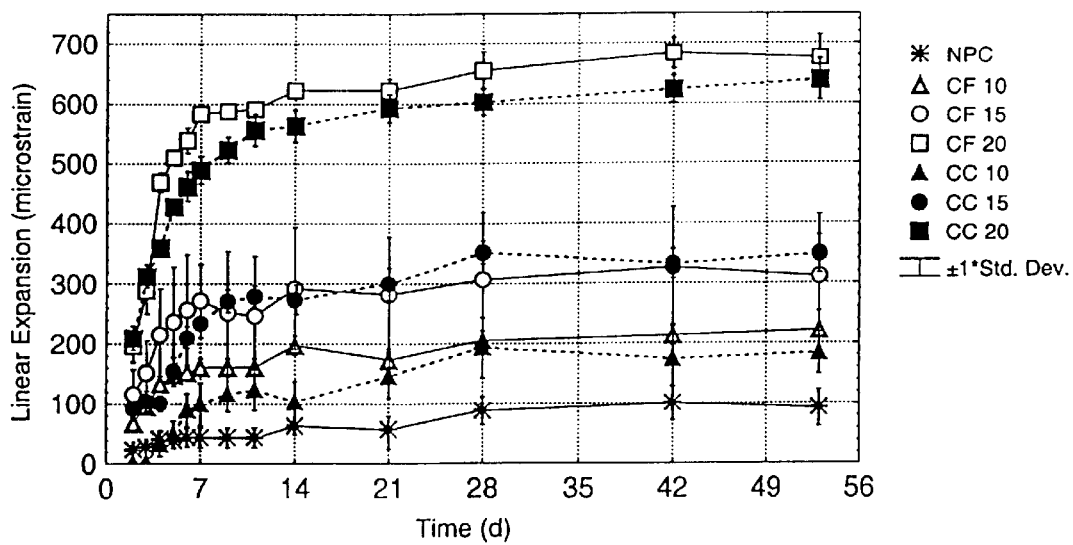
FIG. 8 is a second graphical representation illustrating the linear free expansion promoted by the additive in mortars prepared accordingly with the mixtures of Table 2.

FIG. 8 illustrates the effect of the C$_3$AH$_6$ particle size distribution on the extent and rate of expansion.

Admixtures of C$_3$AH$_6$—F and C$_3$AH$_6$—C produced significant expansion in the mortar; this expansion was slightly larger than for the admixture with finer particles.

Despite the dosage or type of the admixture, more than 80% of the expansion measured at 53 days occurred in the first seven days after mixing.

Compressive Strength Tests

Figure 9:
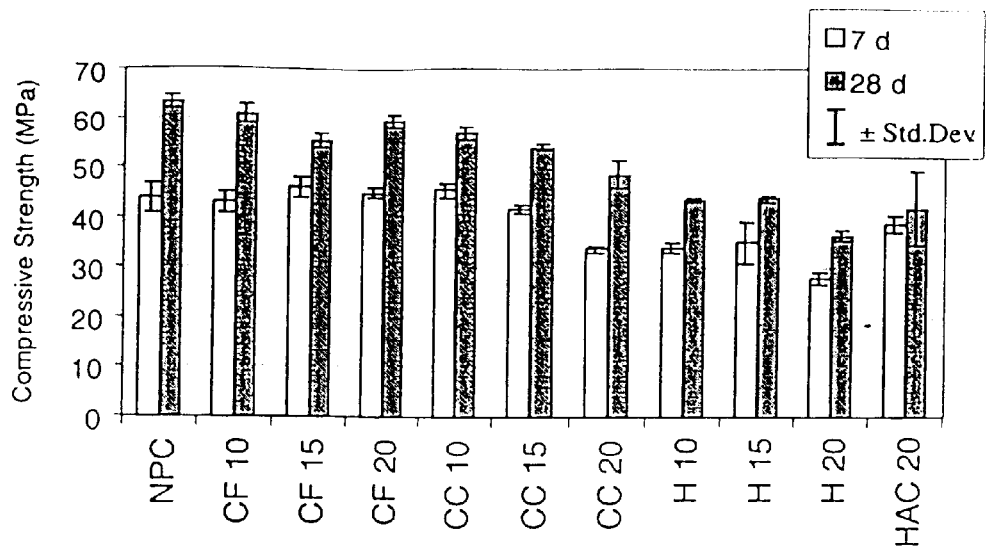
FIG. 9 is a graphical representation illustrating the compression strength of mortars prepared with different amounts and compositions of additives.

These tests were conducted using mortar cubes in compliance with ASTM C 109. Six cubes were tested for each mortar mixture with three at the age of seven days and three at the age of 28 days. Compressive strength data are illustrated in FIG. 9. It will be appreciated that the results indicate consistently less strength for the mortars prepared with CAH$_{10}$ when compared with the mortars prepared with the admixture containing C$_3$AH$_6$—F or C$_3$AH$_6$—C particles. The decrease was noted to be approximately 25%. The use of the admixture prepared with C$_3$AH$_6$—F did not affect the compressive strength relative to the strength of the mortar without the admixture. Regarding the mortars with C$_3$AH$_6$—C, the reduction in compressive strength appears to be proportional to the increase of dosage of the admixture. The use of HAC (unhydrated admixture) resulted in a significant reduction in the compressive strength.

Heat Evolution Tests

Figure 10:
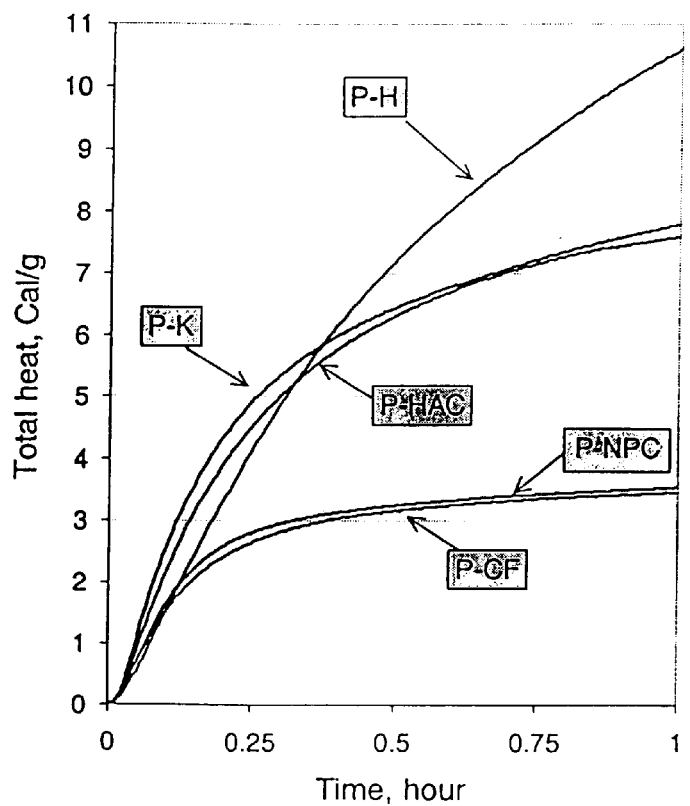
FIG. 10 is a graphical representation of total heat as a function of time for the hydration of pastes prepared with differing cement mixtures.

Conduction calorimetry was the technique employed to obtain the data. This equipment facilitated continuous monitoring of heat evolution from the moment water was placed in contact with the dry materials. The pastes formulated with the mixture proportions indicated in Table 1, were monitored for 60 minutes. FIG. 10 sets forth the heat evolution of the paste mixtures and it is evident that there is shown a large heat evolution from the mixture with $CAH_{10}$ particles at an early hydration time (within the first 60 minutes). It is believed that this is related to the formation of larger amounts of ettringite.

Hydration of the mixture prepared with Type K cement (P-K) and the mixture containing the expansive admixture prepared with anhydrous high alumina cement (P-HAC) also displayed high amounts of heat at the first hour of hydration. This is considerably higher than the heat associated with the mixtures P-NPC and P-CF, respectively, than the paste with Type 10 cement only and that contained CAH admixture prepared with $C_3AH_6$—F particles. It is believed that the early formation of ettringite is probably the cause for the drastic loss in the flow and the shortening on the initial and final setting times observed for the mortars containing $CAH_{10}$ and anhydrous high alumina cement (HAC) illustrated in FIGS. 5 and 6.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. An expansive additive for controlling shrinkage in a cementitious mixture, comprising:
    calcium aluminate particles where at least 75% by mass of said particles are hydrates of $C_3AH_6$, $CAH_{10}$ or a mixture thereof, where C represents CaO, A represents $Al_2O_3$, and H represents $H_2O$, said mass of said particles being fully hydrated;
    an expansion effecting sulfate containing compound for effecting expansion in said mixture; and
    calcium hydroxide.

2. The additive as set forth in claim 1, wherein said hydrates of $C_3AH_6$ or $CAH_{10}$ or mixture thereof are 100% hydrated.

3. The additive as set forth in claim 1, wherein said expansion effecting sulfate compound is a calcium sulfate compound.

4. The additive as set forth in claim 1, wherein 25% or less of said calcium aluminate particles are anhydrous or hydrates other than hydrated $C_3AH_6$ or $CAH_{10}$.

5. The additive as set forth in claim 3, wherein said calcium sulfate compound is selected from the group consisting of calcium sulfate dihydrate, calcium hemihydrate and calcium anhydrite.

6. The additive as set forth in claim 3, wherein said calcium sulfate compound has a purity of at least 90%.

7. The additive as set forth in claim 1, wherein said calcium hydroxide has a purity of at least 90%.

8. The additive as set forth in claim 1, wherein said calcium aluminate hydrate particles and said gypsum are in a ratio of between 1:0.35 and 1:0.55 by mass.

9. The additive as set forth in claim 1, wherein said calcium aluminate hydrate particles and said calcium hydroxide are in a ratio of between 1:0.07 and 1:0.15 by mass.

10. The additive as set forth in claim 4, wherein said cubic phase particles and said hexagonal phase particles are in a ratio of between 1:0.0 and 0.0:1 by mass.

11. A cementitious mixture having reduced shrinkage upon curing, comprising:
    cementitious material;
    calcium aluminate particles where at least 75% by mass of said particles are hydrates of $C_3AH_6$, $CAH_{10}$ or a mixture thereof, where C represents CaO, A represents $Al_2O_3$, and H represents $H_2O$, said mass of said particles being fully hydrated;
    an expansion effecting sulfate containing compound for effecting expansion in said mixture; and
    calcium hydroxide.

12. The mixture as set forth in claim 10, wherein said cementitious material is selected from the group consisting of Portland cement, flyash, blast furnace slag, rice husk ash, type K cement, type S cement, type M cement, grout, stucco, shotcrete, patching compound and concrete.

13. The mixture as set forth in claim 11, wherein 25% or less of said calcium aluminate particles are anhydrous or hydrates other than hydrated $C_3AH_6$ or $CAH_{10}$.

14. A method for synthesizing hexagonal phase calcium aluminate hydrate particles, comprising the steps of:
    i) providing a source of calcium aluminate particles;
    ii) hydrating said calcium aluminate sufficiently to form a slurry;
    iii) agitating said slurry sufficiently for hydration to occur and form hexagonal phase calcium aluminate hydrate particles;
    iv) maintaining the temperature of said slurry to prevent thermal conversion of said hexagonal phase calcium aluminate hydrate particles to cubic phase calcium aluminate particles; and
    v) drying said slurry at a temperature to prevent thermal conversion of said hexagonal phase calcium aluminate hydrate particles to cubic phase calcium aluminate particles.

15. The method as set forth in claim 14, further including the step of filtering said slurry prior to step iv).

16. The method as set forth in claim 14, wherein said slurry is dried in an atmosphere that prevents carbonation of more than 3% of the mass of the particles.

17. The method as set forth in claim 14, wherein said temperature of said slurry in step v) is maintained at a temperature of less than 25° C.

18. The method as set forth in claim 14, wherein said temperature of said slurry in step iv) is maintained between −2° C. and +7° C.

19. A method for synthesizing cubic phase calcium aluminate hydrate particles, comprising the steps of:
    i) providing a source of calcium aluminate particles;
    ii) hydrating said calcium aluminate sufficiently to effect hydration of at least 75% by mass of said particles in a slurry;
    iii) agitating said slurry sufficiently for hydration to occur;
    iv) maintaining the temperature of said slurry in a range sufficient to convert any hexagonal phase calcium aluminate particles formed to cubic phase calcium aluminate hydrate particles; and
    v) drying said slurry.

20. The method as set forth in claim 19, wherein said temperature in step iv) is between 70° C. and 80° C.

21. The method as set forth in claim 19, wherein said slurry is agitated for a period between 10 minutes and 40 minutes.

22. The method as set forth in claim 19, wherein said slurry is dried at a temperature of between 25° C. and 27° C.

23. A method for synthesizing cubic phase calcium aluminate hydrate particles, comprising the steps of:
    i) providing a source of calcium aluminate particles;
    ii) hydrating said calcium aluminate particles;
    iii) curing said mixture in a humid atmosphere for a period sufficient to prevent self desiccation at a temperature sufficient to effect conversion of hexagonal phase particles to said cubic phase calcium aluminate hydrate particles; and iv) drying said mixture.

24. The method as set forth in claim 23, wherein said particles are dried in an atmosphere for preventing carbonation.

25. The method as set forth in claim 23, wherein said temperature in step iii) is at least 60° C.

26. The method as set forth in claim 23, wherein said mixture is dried at a temperature of between 25° C. and 27° C.

27. A method for synthesizing hexagonal phase calcium aluminate particles, comprising the steps of:

i) providing a source of calcium aluminate particles;

ii) hydrating said calcium aluminate particles;

iii) curing said mixture in a humid atmosphere for a period sufficient to prevent self desiccation at a temperature sufficiently low for preventing conversion of hexagonal particles to cubic particles; and iv) drying said mixture.

28. The method as set forth in claim 27, wherein said temperature is 7° C. or lower.

29. A method of forming a cementitious mixture having reduced shrinkage in use, comprising mixing the compounds:

i) cementitious material;

ii) an expansion effecting sulfate compound for effecting expansion in said mixture;

iii) calcium hydroxide; and iv) presynthesized calcium aluminate hydrate particles formed by the method of claim 14.

30. The method as set forth in claim 29, wherein said expansion effecting sulfate compound is a calcium sulfate compound.

31. The method as set forth in claim 30, wherein said calcium sulfate compound is selected from the group consisting of calcium sulfate dihydrate, calcium hemihydrate and calcium anhydrite.

32. A method of forming a cementitious mixture having reduced shrinkage in use, comprising mixing the compounds:

i) cementitious material;

ii) an expansion effecting sulfate compound for effecting expansion in said mixture;

iii) calcium hydroxide; and iv) presynthesized calcium aluminate hydrate particles formed by the method of claim 19.

33. The method as set forth in claim 32, wherein said expansion effecting sulfate compound is a calcium sulfate compound.

34. The method as set forth in claim 32, wherein said calcium sulfate compound is selected from the group comprising calcium sulfate dihydrate, calcium hemihydrate and calcium anhydrite.

35. A method of forming a cementitious mixture having reduced shrinkage in use, comprising mixing the compounds:

i) cementitious material;

ii) an expansion effecting sulfate compound for effecting expansion in said mixture;

iii) calcium hydroxide; and iv) presynthesized calcium aluminate hydrate particles formed by the method of claim 27.

36. The method as set forth in claim 35, wherein said expansion effecting sulfate compound is a calcium sulfate compound.

37. The method as set forth in claim 35, wherein said calcium sulfate compound is selected from the group consisting of calcium sulfate dihydrate, calcium hemihydrate and calcium anhydrite.

38. A method of forming a cementitious mixture having reduced shrinkage in use, comprising mixing the compounds:

i) cementitious material;

ii) an expansion effecting sulfate compound for effecting expansion in said mixture;

iii) calcium hydroxide; and iv) presynthesized calcium aluminate hydrate particles formed by the method of claim 23.

39. The method as set forth in claim 38, wherein said expansion effecting sulfate compound is a calcium sulfate compound.

40. The method as set forth in claim 38, wherein said calcium sulfate compound is selected from the group consisting of calcium sulfate dihydrate, calcium hemihydrate and calcium anhydrite.

* * * * *